United States Patent [19]

Wyman

[11] 4,426,488

[45] Jan. 17, 1984

[54] ELASTOMERIC COMPOSITION

[76] Inventor: Ransome J. Wyman, 821 Camino Colibri, Calabasas, Calif. 91302

[21] Appl. No.: 380,367

[22] Filed: May 20, 1982

[51] Int. Cl.$^3$ .................................................. C08K 3/22
[52] U.S. Cl. .................................... 524/783; 524/779; 524/786; 524/836; 524/839
[58] Field of Search ............... 524/783, 786, 779, 875, 524/871, 507, 839, 836

[56] References Cited

FOREIGN PATENT DOCUMENTS 53-43913  4/1978  Japan ................................. 524/507

OTHER PUBLICATIONS

J. H. Saunders and K. C. Frisch, *Polyurethanes Chemistry and Technology, Part II, Technology,* John Wiley & Sons, 1964.
E. N. Doyle, *The Development and Use of Polyurethane Products,* McGraw-Hill Book Company, 1971.
J. H. Saunders and K. C. Frisch, *Polyurethanes Chemistry and Technology Part I, Chemistry,* John Wiley & Sons, 1962.
Olin Urethane Chemicals Appl. Data, "Moisture-Set Systems for Polyurethane Coatings", Olin Corporation, 1977.
G. E. Owen et al., "Preparation of Practical One-Part Urethane Coating Compositions," Paint Bull. PB-4, Elastomer Chemicals Department, E. I. du Pont de Nemours & Co., Inc.

*Primary Examiner*—Lewis T. Jacobs
*Attorney, Agent, or Firm*—Nilsson, Robbins, Dalgarn, Berliner, Carson & Wurst

[57] ABSTRACT

A method and composition are provided for preparing elastomeric polymers containing a particulate rubber filler which are useful to provide relatively thick membranes for flooring, decking, roofing or other purposes and which permit the molding of a wide variety of rubber-like goods. The composition comprises a polyol, an organic polyisocyanate, an alkaline carbon dioxide absorbent and a water carrier in amounts sufficient to form a non-foaming pourable, trowelable or sprayable composition, includes rubber particles to provide increased resiliency, economy and density, and cures internally to provide a polyurethane elastomer coating. A prepolymer may be prepared as a separate component having an extended shelf life and adapted for ultimate combination with an aqueous rubber slurry in order to facilitate simple on site mixing of the composition.

17 Claims, No Drawings

ELASTOMERIC COMPOSITION

FIELD OF THE INVENTION

This invention relates generally to the field of art which includes elastomeric polymers and more particularly to the production of covering membranes and moldable articles made therefrom.

BACKGROUND AND SUMMARY OF THE INVENTION

Waterproof compositions which may be used to form covering membranes for surfaces such as roofs, floors and decks have long been known to possess certain disadvantages. For example, roofing pitch, comprised of coal tar distillates having a softening point of between 50° C.–60° C., provides an excellent water barrier and a thick coating but requires heating far above the softening point for application. Thus an open flame, large apparatus and rapid deployment are required which, in many cases, may prohibit its use. While naphtha solvent may improve the softening point and hardening time of roofing pitch, these problems are not totally eliminated and the additional problems of flammability and fuming are presented. Moreover, roofing pitch is inappropriate for covering floors as pedestrian and vehicular traffic easily distort the membrane.

Solvent or solution resin coatings, comprising organic solvents as the evaporative vehicle, have only limited use as decking material. As the solvent evaporates during the drying of the coating, considerable irritation and odor may be caused. Also, organic solvents are not inexpensive, contribute substantially to the costs of the coating composition and, due to their high flammability, are hazardous during the manufacture and use of the coatings. In addition, coatings or covering membranes which depend on solvent evaporation for curing can generally be applied only in thin coats to allow such evaporation, and repetitive applications are required to achieve the required thickness. Water emulsion coatings such as latex compositions avoid some of the problems of the organic solvent coatings, but still require a series of thin coatings to allow water evaporation. Latex coatings are relatively expensive for roofing and decking purposes and, in the sme manner as the solvent resin coatings, are bereft of the strength and resiliency required for membranes which must bear traffic e.g. floor covering membranes.

Various elastomeric substances have been proposed and used as covering membranes, but each has heretofore been possessed of certain disadvantages. For example, catalyst cured urethanes or other polymers allow the production of impervious and resilient rubber-like material. However, such polymers are expensive and, in the same manner as the externally cured polyurethanes described below, must be carefully mixed and applied under careful temperature control, and require skilled labor and specialized static or dynamic mixing equipment which is cost intensive. When curing catalysts are employed for polyurethane elastomers, moisture must be excluded during mixing and application e.g. excessive humidity or rain will accelerate or otherwise detrimentally affect cure.

Moisture-cured polyurethane elastomers formed from polyols and isocyanate compounds i.e. externally cured polyurethanes, have been used to provide waterproof traffic-bearing surfaces for gymnasium floors, balcony surfaces, boiler room floors and rooftop parking decks to great advantage. These urethanes rely on moisture from the ambient air to effect the polymerization. Thus, the cure time is dependent upon the temperature and humidity of the air and as these parameters are somewhat unpredictable cure times of up to one week are not uncommon. If the air is too dry, the composition may totally fail to cure, and if the air is too humid, water bubbles will form. Moreover, it is often difficult to provide a coating of sufficient thickness without repetitive applications, as each coating must be thin enough to allow the migration of moisture therethrough before the top surface hardens, and each coating must be applied within the narrow parameters of temperature and humidity. In addition, because water is the curing reactant, diluents which contain even small amounts of moisture, e.g. rubber buffing dust, cannot be mixed with the prepolymer at the manufacturing facility even though such fillers would yield substantial cost savings. While fillers may be added to such compositions at the application site without causing a premature cure, particulate fillers have proven to be extremely difficult to mix with prepolymers without complex equipment due to the air and moisture entrained thereon. Additionally, air-mosture cure polyurethane elastomer decking membranes must be applied by skilled workmen, and the coating is generally applied only under the supervision of the elastomer manufacturer since the stoichiometry of these elastomers, as well as that of the catalyst cured products, must be exact.

Heretofore, water has not been added as a curing agent in polyurethane coating compositions because water produces carbon dioxide which causes foaming and deleterious bubble formation within the membrane.

The present invention provides an internally curing polyurethane elastomer formed from a polyol, an organic isocyanate, a liquid carrier containing water and a sufficient amount of an alkaline substance to absorb the carbon dioxide produced thereby. The carrier, and the resultant elastomer, also contains substantial quantities e.g. up to 60% weight rubber dust or scrap particles, thereby yielding substantial cost savings, increased resiliency and strength.

The carrier, which may be entirely comprised of water, allows the inclusion of the rubber particulate matter which is otherwise difficult or impossible to mix with polyols due to the entrained air on the particles. The water, substantially in excess of that required to polymerize organic isocyanate terminated polyol serves to form a slurry with the particulate matter to facilitate mixing with the prepolymer and to absorb a portion of the carbon dioxide produced by the polymerization reaction. Alkaline materials such as magnesium or calcium oxide are added to assist in absorbing this gas.

Further, the excess water reacts with the organic isocyanate to form a non-toxic urea complex, thus eliminating the toxic free isocyanate which is present in the polyurethane compositions heretofore known. Thus, the coating compositions or molded articles of the present invention may be used or produced in areas where prior compositions would present a threat to health and safety e.g. floor coatings for horse barns and trailers.

According to a method of the present invention, the composition is prepared from two components, each having an extended shelf life and adapted to facilitate on-site mixing, and which may be applied without the need for complex machinery or highly skilled workmen. A coating may be poured, brushed, trowelled or sprayed to vertical or horizontal surfaces to form a durable monolithic membrane having sufficient structural rigidity to withstand repeated abrasion from vehicular and pedestrian traffic. The viscosity of the composition may be easily controlled for the particular method of application, and the resiliency of the membrane may be adapted to the desired use.

As the composition cures internally, i.e., in the absence of atmospheric moisture, and is easily prepared from pumpable precursors, it may be used to form a wide variety of thick, molded articles such as mats or rubber-like structural components. It will be appreciated that the result is a low-cost elastomeric composition which may be easily mixed and applied as a thick coating by unskilled workers. Precise addition of the curing agent, heretofore required, is unnecessary since water is added in a substantial stoichiometric excess. This inclusion of water in a substantial excess of the stoichiometric amount required for polymerization allows the addition of particulate fillers without complex mixing equipment and, along with alkaline additives, absorbs the carbon dioxide produced so that foaming does not take place.

DETAILED DESCRIPTION

While the invention will be exemplified by reference to a specific polyurethane elastomeric polymer, the invention in general and certain aspects in particular are broad in scope, for example, the concepts of curing a particulate rubber containing polyurethane elastomer with an excess of water and including an alkaline component to absorb the carbon dioxide produced thereby, and providing a method whereby a prepolymer component and a water-particulate rubber slurry may be easily mixed to form a superior coating membrane. Consequently, specific details disclosed herein are merely representative and are deemed to afford the best embodiments at this time known to provide a basis for the claims which define the scope of the present invention.

The polyol can be chosen from a variety of OH terminated polyethers. Preferred are the polyoxyalkylene polyols having two-four hydroxyl groups and where the alkylene group has 2–6 carbon atoms. A large variety are available, obtained by polymerization of an aklylene oxide, such as ethylene oxide, probylene oxide or butylene oxide with a glycol. Polyethers having higher functionality may be obtained by reaction with a diol, triol or higher polyol, such as glycerine, trimethylol propane, and pentaerythritol. Polyols of the above types are available commercially, for example: Voranols (Trademark), Dow Chemical Company: Poly-G (Trademark) from Olin Chemicals Division; and Pluracols (Trademark) from BASF Wyandotte Corporation. In particular, a predominantly polypropylene-oxide triol having a molecular weight of at least 1,000 is most suitable.

Polyols may be used up to a molecular weight which produces a viscosity in excess of that required for the desired application. Polyols having a molecular weight of less than about 500 begin to lose some elastomeric properties and those having a molecular weight of less than about 200 become rigid and produce large amounts of carbon dioxide. Polyols having a high ethylene oxide content on the backbone show increased reactivity, i.e. shorten pot life, and greater water compatability, both of which properties show advantages in the spray application hereinafter described.

Any of the organic polyisocyanates used in the art to prepare polyurethanes and polyurea-contraining polyurethanes can be used, for example, hexamethylene diisocyanate; m-xylylene diisocyanate; toluene diisocyanate; polymethylene polyphenylisocyanate; 4,4'-diphenylmethane diisocyanate; m-phenylene diisocyanate; p-phenylene diisocyanate; 3,3'-dimethyl-4,4'diphenyl diisocyanate; methylenebis (2-methyl-p-penylene) diisocyanate; 3,3'-dimethoxy-4,4'-biphenylene diisocyanate; 2,2', 4,4'-tetramethyl-4,4'-biphenylene diisocyanate; 3,3'-dimethyl-4,4'-diphenylmethane diisocyanate; 4,4'-diphenyl-isopropylidene diisocyanate; 1,5'-naphthylene diisocyanate; and polymethylene polyphenylisocyanate. One group of especially preferred polyisocyanates are the toluene diisocyanate isomers, particularly 2,4-toluene diisocryanate. The commercially available blends of the 2,4- and 2,6-isomers are effective—the 80:20 and 65:35 blends being most readily available. Another especially preferred polyisocyanate is polymethylene polyphenylisocyanate such as sold by the Upjohn Company under the trademark PAPI 901. This has an average molecular weight of 260–300, an isocyanate equivalent of 133, an NCO content of 31.6 weight percent, an acidity of 0.05% as HCl and a viscosity at 25° C. of 80 lps. Generally, an increase in the amount of isocyanate yields an increase in the strength of the composition.

The isocyanate and polyol may be combined, along with other ingredients hereinafter described, to form a prepolymer A-side or component. The A-side may also include a processing or extender oil which serves to modify the viscosity and attenuate the cost of the composition. Any of the processing oils commonly used in the industry that are compatible with the urethane elastomer may be used. Preferably, the extender oil is substantially aromatic and may contain polar compounds. Particularly effective oils are the aromatic extender oils sold under the trademarks Califlux LP and BearflexLPO, both sold by the WITCO Chemical Company. Califlux LP comprises about 78% aromatics and 9% polar compounds, the remainder being saturates. It has a specific gravity at 6° F. of 0.9786, and a PI gravity of 13.1, a viscosity (SUS) at 100° F. of 169, a flash point (COC) of 320° F. and an aniline point of less than 59° F. The Bearflex LPO extender oil has about 77% aromatics, 3% polar compounds at 20% saturates. It has a specific gravity at 60° F. of 0.9679, and a PI gravity of 14.7, a viscosity (SUS) at 100° F. of 130, a flash point (COC) of 310° F. and an aniline point of 59° F. Escapol (Exxon), a 100% aromatic by-product of aqueous polyethylene production, allows the inclusion of oil up to 65% of the A-side or 40% of the total composition.

Generally, the higher the amount of polar components and aromatic content of the extender oil, the better will be the compatibility in the polyurethane elastomer, since such elastomers have polar groups. Generally, the processing oil will comprise from 20% to 60% of the A-component. The omission of the processing oil makes the components harder to mix and increases the expense of the composition, but does not otherwise affect the elastomer formation. The oil content may be increased up to about 200% of the polyurethane content whereupon the oil begins to bleed out of the cured polymer.

Water may also be included in the A-side in order to allow the addition of higher concentrations of isocyanate, but must not be present in a quantity sufficient to cause the polymerization of the polyol and isocyanate reactants. Generally, the water content of the A-component must be kept below 1.0%.

Other optional ingredients include pigments to provide a desired color to the coating membrane, and antioxidants to prevent the oxidation of the polymeric backbone. Any of the common antioxidants, such as butylated hydroxytoluene, sold as Ionol (trademark) by the Shell Oil Company, may be used.

The B-side or component contains water in at least the stoichiometric amount required to polymerize the polyol and the isocyanate reactants, an alkaline component in an amount sufficient to absorb carbon dioxide which is given off during the curing reaction. The carbon dioxide is thus eliminated by chemical reaction e.g. by combining with calcium oxide to form calcium carbonate. Absorbents such as calcium oxide or hydroxide, magnesium oxide, sodium hydroxide, potassium hydroxide, aluminum trihydrate, zinc oxide or other such absorbents may be used. The alkaline component also provides a basic environment which is highly favorable to the polymerization of the polyurethane elastomer. The B-component further includes sufficient liquid carrier, preferably additional water, to provide proper viscosity and allow the addition of particulate matter as desired. When water is used as the carrier, it is presently thought that at least about 20 percent water in the B-component is sufficient to form the rubber-particle slurry hereinafter described.

Colloidal hydrated silicates e.g. clay or other optional fillers may also be added to the B-side as fillers or thickeners and to assist in the slurry formation hereinafter described, as may small amounts of surfactants e.g. approximately 1% of the B-side composition. Other thickeners include calcium cabonate, talc, carbon black, cabosil, ground walnut shells or rice hulls, water soluble amines, gelling agents or crosslinkers.

Scrap rubber strands, rubber buffing dust or other rubber particulate material are added to the B-side to form a slurry which may thereafter be easily mixed with the A-side to form the elastomeric coating membrane of the present invention. A wide range of natural or synthetic rubber materials may be used, from a very coarse strand-like material having a maximum dimension of from ¼ to ½ an inch, to a very fine rubber dust passing a 40-mesh sieve such as that which is ground from tires before retreading. The particular size of rubber may be varied in accordance with the intended use of the membrane, and where a denser product is desired, it is preferable to use varying sizes of rubber particles in order to decrease the voids therebetween. In a specific example hereinafter described, the addition of a small amount of surfactant allows the addition of a higher proportion of rubber particles in relation to a given amount of water, and the surfactant in combination with colloidal substances such as clay provides a semi-thixotropic composition which suspends the rubber particles for an extended period of time.

The rubber particles in the present composition provide substantial advantages over the prior liquid systems. While liquid coatings tend to self-level, the friction between the rubber particles enables the present composition to retain its applied thickness or shape until the curing occurs. This is especially critical in decking applications where the inherent imperfections in such surfaces, coupled with any self-leveling tendency, cause variations in membrane thickness which result in uneven wear, resiliency and protection of the coating. The rubber particles also clog and seal any perforations in the underlying surface. However, if self-leveling is desired, the amount of rubber particles may be decreased or other component percentages may be altered to reduce the viscosity of the composition.

Depending upon the application, a portion or all of the B-component may be mixed immediately prior to use, or the B-side may be prefemixed at the factory. For example, the rubber particles, clay, alkaline component and surfactant could be prepackaged and shipped, along with the A-side, to the use site whereupon the water portion of the B-component could be added thereto until a uniform slurry is formed, and thereafter adding the proper amount of the A-side to the slurry. It will be recognized that substantial shipping costs will be saved by this technique, and the ease of mixing both the B-side slurry and the combined A- and B- components will allow these operations to be performed without skilled polymer technicians. Moreover, the B-component, in a dry state, has an unlimited shelf life and the A-components hereafter described have shown a shelf life of 7 to 8 years without degradation.

The following examples, in which all parts are by volume unless indicated otherwise, further illustrate the invention.

EXAMPLE 1

The A-side of a liquid polyurethane elastomer precursor was prepared by mixing 48.8 parts of a 2,000 molecular weight polypropylene glycol diol with 14.8 parts of toluene diisocyanate. The toluene diisocyanate was a commercial 80:20 blend of the 2,4- and 2,6-isomers, specifically, Mobay Mondur TD-80. In addition the A-side contained 35.7 parts of Califlux LP extender oil, 0.325 parts water, 0.16 parts Ionol antioxidant and 0.2 parts carbon black pigment.

The various ingredients, as herein described, have been separated into A and B components for ease of mixture e.g. to provide equal volumes for on-site mixing. It is to be understood that the ingredients may be placed on either side as long as the isocyanate is not mixed with a stoichiometric excess of water in a pre-mix form. For example, a water soluble polyol may be mixed with the water on the B-side, or the carbon dioxide absorbent may be mixed on the A-side although the absorbing efficiency may be somewhat decreased. In applications where the elastomer is prepared and molded at a factory or in other situations where easily mixed components are not required, the ingredients may be mixed in any desired order which allows the proper dispersal of the rubber particles throughout.

The B-side contained 12 parts of ¼ to ½ inch long rubber strands, 16 parts coarse rubber i.e. −1/16 to ⅛ inch squares, 24 parts fine rubber passing a 40-mesh sieve, 8 parts clay, 4 parts magnesium oxide, and 1 part soap flakes as a surfactant. To this mixture was added 35 parts of tap water followed by mixing with a spatula until a uniform slurry was formed.

A equal amount of the A-component was then added to the slurry, and mixed with a paint mixer attached to a hand drill until homogenous.

The mixture of EXAMPLE 1 had a working life i.e. pot life of bout 30 to 45 minutes. The material was poured onto a concrete warehouse floor joint and trowelled to provide a smooth bridging surface thereacross. The composition set up to about an 80% cure in 16 to 20 hours. In this and other applications, it was determined that the material could be applied in thicknesses as great as 2 inches without foaming. As the material is not dependent upon atmospheric moisture or evaporation in order to cure, such thick coatings displayed an even cure throughout.

The warehouse floor coating specifically described and other test coatings have withstood extensive pedestrian and vehicular traffic without crumbling, abrasion or separation from the substrate.

EXAMPLE 2

In a manner similar to that described in EXAMPLE 1, a second mixture was prepared wherein the A-side consisted of 43 pats of a 6,500 molecular weight polypropylene glycol triol, 7 parts toluene diisocyanate and 50 parts of Califlux LP extender oil.

The B-side was a blend of 26 parts rubber strands, 18 parts coarse rubber, 13 parts fine rubber, 3.6 parts clay, 6 parts magnesium oxide and 0.9 parts soap flakes in a slurry with 33 parts water.

Equal amounts of the A- and B-components were mixed by hand with a paddle and exhibited properties similar to those of the composition of EXAMPLE 1.

With regard to EXAMPLE 2, it will be seen that up to 25% of the total composition may be an extender oil without evidence of oil bleeding from the final membrane. EXAMPLE 3

Yet another composition was prepared wherein the A-side included 44 parts of a 1,000 molecular weight polypropylene glycol diol, 16 parts toluene diisocyanate and 40 parts of Califlux LP extender oil. The B-side was prepared and mixed with the A-side as set forth in EXAMPLE 2.

Each of the compositions from EXAMPLES 1–3 showed similar properties of good adhesion to both vertical and horizontal surfaces, lack of foaming and uniform cure throughout thick coatings.

The compositions were further tested by molding a variety of shapes having maximum dimensions of from 1 to 8 inches. Each retained the molded shape and was allowed to cure free standing for 24 hours, and thereafter exhibited an even cure throughout. Each shape was then immersed in water and boiled for 2 weeks. Upon examination, none of the molded articles exhibited any component breakdown or loss of resiliency.

The ease of application of each was further shown by spraying the compositions from a conventional air breakup or mastic spray apparatus. A Binks Model 98-1038 texture pulp sprayer (Binks Manufacturing Co.) was used to spray the composition through a 7E2 spray gun. Using this method, the compositions of the present invention may quickly be applied to walls, floors and decks to form a coating membrane of any desired thickness. It should be noted that while the coating membranes known in the prior art may be sprayed, those containing evaporative solvents present increased fire hazard upon spraying.

While the present compositions may be sprayed from such spraying devices, the fact that the polymerizing mixture is contained in the spray lines, spray gun and reservoir may present cleanup problems especially in fast curing mixtures. Accordingly, it may be advantageous to use a two-component spray system wherein the A and B components are mixed at the spray gun.

In this regard, additional water is added to the B-side to provide a pumpable rubber slurry i.e. preferably from 30% to 50% of the B-component. This allows a pumpable viscosity to be obtained without warming the components as heretofore required with sprayable polyurethane compositions. Upon spraying, a portion of the water evaporates and cools the composition so that the coating, prior to cure, has sufficient viscosity to form a non-sagging film on vertical surfaces. Thus, each of the compositions of Examples 1–3 may be prepared with an additional amount of water of about 15% in the B-side. The A- and B-components are of a low viscosity so that each may be easily pumped to and mixed at the spray nozzle to form a sprayable composition which exhibits a substantial increase in viscosity during spraying. This property, along with the interparticulate friction of the rubber filler, ensures a sag-free coating. Prior systems have required highly reactive compositions to accomplish this end. As the composition cures internally, repeated passes with a spray gun allow the continuous buildup of thick coatings on vertical surfaces.

It can be seen that the composition and method of the present invention enables a variety of formulations wherein premixed components may be easily combined at a job site to provide an advantageous coating composition. The liquid carrier of the slurry component i.e. the B-side herein described, is selected primarily with regard to cost, compatibility with the other ingredients and ability to form the desired slurry. A small amount of water, generally approximately $\frac{1}{2}$%, is required to cure the polymer, and therefore at least this amount must be included in the B-side slurry component. The remainder of the carrier may be any non-reactive liquid, i.e. having no reactive hydroxyl on amine groups, which does not interfere with urea bonding and provides the advantages of slurry formation and absorption herein described.

In the examples above, the excess water enables the formation of a slurry which facilitates easy mixing of the A and B sides and the majority of this excess is suspended within the coating upon cure. It should be noted that higher levels of water promote a lower viscosity and tend to increase the fire retardancy of the coating.

Other methods, known in the art, to decrease the flammability of the coating may be used, such as the inclusion of fire retardant chemicals or by covering the coating, prior to cure, with a fire retardant material such as sand or gravel. For example, non-flammable processing oils may be used, as may halogenated paraffins or phosphorus compounds such as triaryl or trialkyl phosphate.

From the foregoing description, one skilled in the art can easily ascertain the essential characteristics of the invention, and without departing from the spirit and scope thereof, can make various changes and modifications to adapt the invention to various usages and conditions.

The invention is claimed as follows:

1. An elastomeric composition formedf as a reaction product of a polyol, an organic polyisocyanate, a liquid carrier including water in stoichiometric excess of that required to polymerize the polyol and the isocyanate reactants and an alkaline absorbent for the carbon dioxide produced by the reaction, and including rubber particles distributed therethrough.

2. The elastomeric composition of claim 1 which contains oil up to an amount retained by the cured elastomer without excessive oil bleeding.

3. The elastomeric composition of claim 1 or 2 wherein the polyol is a diol or triol.

4. The elastomeric composition of claim 3 wherein the polyisocyanate is toluene diisocyanate.

5. The elastomeric composition of claim 4 wherein the alkaline absorbent is selected from the group consisting of magnesium oxide, calcium oxide, sodium hydroxide, potassium hydroxide, calcium hydroxide, aluminum trihydrate and zinc oxide, alone or in combination.

6. An elastomeric composition formed as the reaction product of a diol or triol, an organic polyisocyanate, an alkaline carbon dioxide absorbent and water in at least the stoichiometric amount required to polymerize the polyol and the polyisocyanate reactants and including rubber particles, a liquid carrier and an extender oil.

7. A method of preparing an elastomeric composition comprising the steps of compounding a first component including a polyol and an organic isocyanate, and mixing with the first component second component in slurry form and comprising a liquid carrier including water in a least the stoichiometric amount required to polymerize the polyol and the isocyanate reactants, rubber particles and an alkaline carbon dioxide absorbent.

8. The method of claim 7 wherein the first component includes an extender oil and the second component includes a thickening agent.

9. A method of preparing an elastomeric coating composition comprising the steps of mixing a polyol, an organic isocyanate, rubber particles suspended in a liquid carrier including water in stoichiometric excess of that required to polymerize the polyol and the isocyanate reactants and an alkaline carbon dioxide absorbent.

10. The method of claim 9 which further comprises the step of adding oil up to 35% of the composition.

11. The method of claim 7 or 9 wherein the polyol is a diol or triol.

12. The method of claim 7 wherein the first component further includes oil up to 65% of said first component.

13. The method of claim 10 or 12 in which a major portion of said oil is aromatic, said oil containing a significant amount of polar compounds.

14. The method of claim 11 wherein the organic polyisocyanate is toluene diisocyanate.

15. The method of claim 11 wherein the alkaline carbon dioxide absorbent is selected from the group consisting of magnesium oxide, calcium oxide, calcium hydroxide, sodium hydroxide, potassium hydroxide, aluminum trihydrate and zinc oxide, alone or in combination.

16. A method of preparing an elastomeric coating composition comprising the steps of compounding a first component including a diol or triol, an organic isocyanate and an extender oil; and mixing with the first component a slurry comprising water in a least the stoichiometric amount required to polymerize the polyol and the isocyanate reactants, rubber particles and an alkaline carbon dioxide absorbent.

17. A method of preparing a polyurethane elastomeric coating composition, which method comprises the steps of: compounding at a first location remote from a site of use, a long term storable pre-mix including a polyol and an organic isocyante; transporting said pre-mix to the site of use; and subsequently dispersing into said pre-mix a slurry comprising rubber particles, a carbon dioxide absorbent and water in stoichiometric excess of that required to polymerize the polyol and the isocyanate reactants, thereby forming an internally curable coating composition at said site of use.

* * * * *